Figure 1:
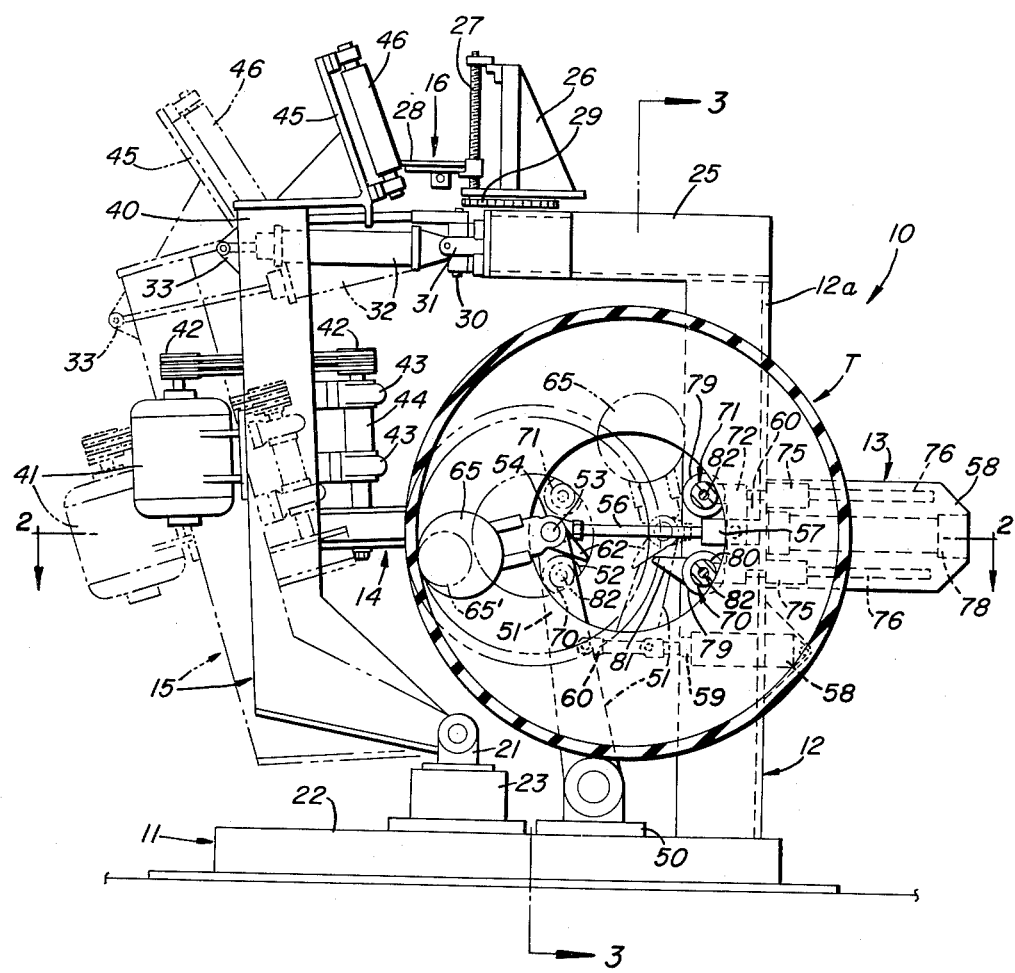

June 13, 1961

A. H. FRÖHLICH ET AL 2,988,121

OSCILLATING BUFFER

Filed April 22, 1957

2 Sheets-Sheet 1

INVENTORS
ADOLF H. FRÖHLICH &
BY EDWARD J. HARRIS

J. William Freeman

ATTORNEY

INVENTORS
ADOLF H. FRÖHLICH &
BY EDWARD J. HARRIS

ATTORNEY

United States Patent Office 2,988,121
Patented June 13, 1961

2,988,121
OSCILLATING BUFFER
Adolf H. Fröhlich and Edward J. Harris, Akron, Ohio, assignors to The Cleveland Trust Company, Cleveland, Ohio, as trustee
Filed Apr. 22, 1957, Ser. No. 654,102
5 Claims. (Cl. 144—288)

This invention relates to the art of retreading pneumatic tires, and in particular, has reference to improvements in buffing equipment used to prepare the exterior surface of a used tire carcass for a recapping operation.

In the known prior art of buffing pneumatic tires prior to recapping, it has long been known that the exterior surface of the used carcass must be buffed to remove excess tread stock that is present on the same. In present devices, this buffing operation is normally confined to the exterior crown region of the tire, due to the fact that recapped tires, at the present time, are normally provided with new tread stock only in the crown region thereof.

However, with the development of certain newly introduced retreading procedures wherein the exterior surface of the worn carcass is recapped from bead-to-bead, it has been found necessary that the side wall portion of the tire be buffed as well as the crown region to which the tread is normally applied.

At the present time it has not been possible to utilize the known prior art for this purpose in view of the fact that the known prior art devices are incapable of being shifted through a path of movement that permits the side walls, as well as the tread portion of the tire, to be buffed.

As an additional disadvantage of the known prior art, it has been found that the revolving brush normally employed therein is incapable of adjustment radially of the tire with the result that the machines in the present day prior art devices are normally limited to use for one size tire only. As a result of this confined adjustment, it is difficult and expensive to adjust the machine for use on additional sizes of tires.

In co-pending application, Serial No. 593,464, filed June 25, 1956, by Adolf Frohlich and Edward J. Harris, there is disclosed an improved type of buffing machine that obviates the aforementioned difficulties of the known prior art.

In general this machine operates on the principle that a revolving brush is oscillated about the axis of the rotating tire with the oscillation of the brush serving to keep the revolving brush in contact with the crown region of the tire so that the tread stock therof could be removed.

In co-pending application, Serial No. 620,411, filed November 5, 1956, by Adolf Frohlich and Edward J. Harris, there was described and disclosed a new and improved type of buffing machine that featured the improvement of progressively advancing the rotating brush radially of the tire, into contact with the revolving crown region of the tire with the result that a new and highly desirable result was obtained in view of the fact that the tread stock in the crown region was progressively removed in gradual steps. The mechanisms utilized in applying the above referred to progressive buffing device included a cam member of adjustable arcuate width, that coacted with an inclined roller so as to progressively advance the buffing wheel into the rotating tire.

While the above type of buffing machine has been found to be satisfactory in many respects, it has been found that even further improved results can be obtained if additional provisions are made for accommodating a wider range of tire sizes so that a plurality of different diameter tires ranging from the smallest passenger size to the largest commercial size can be buffed on the machine without the necessity for expensive revamping or resetting of the same.

Specifically, it has been discovered that if the tire is supported during its rotational movement, about three adjustable points that define the bead diameter of the tire, that new and improved results will be obtained. It has been further found that if one of these points of support is fixed constant with respect to the rotating brush, the remaining two points of support can be adjusted to fit any bead diameter as will be presently described.

Accordingly, the principal object of this invention is to provide a new and improved type of oscillating buffer characterized by the ability of the same to receive a wide range of pneumatic tires having variable bead diameters.

It is a still further object of this invention to provide an improved type of buffing machine that is characterized by being adaptable to use on a wide range of pneumatic tires regardless of the bead dimension therof and further characterized by the fact that the buffing wheel is always on the external crown region of the tire at the same position.

These and other objects of the invention will become more apparent upon a reading of the following brief specification when considered and interpreted in the light of the accompanying drawings.

Figure 2:
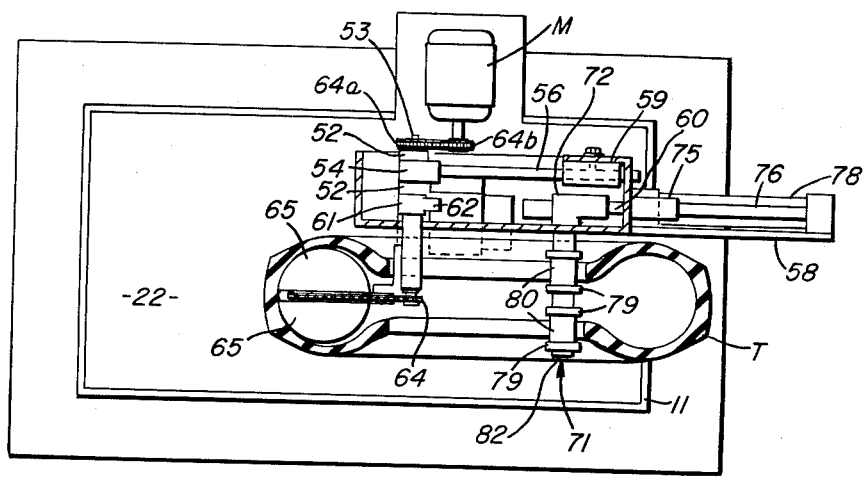
Figure 3:
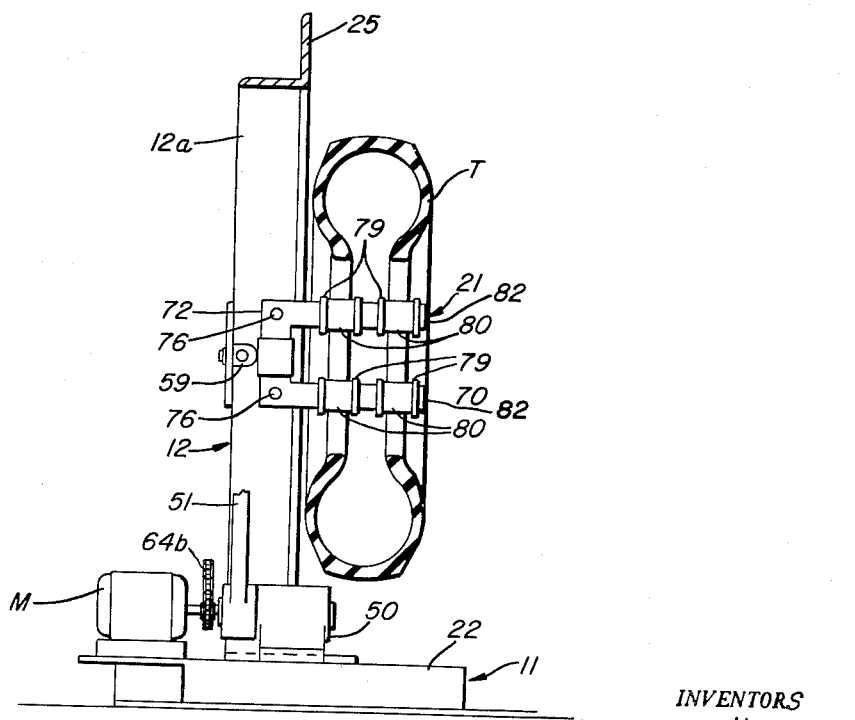

Of the drawings:
FIGURE 1 is a side elevation of the improved buffing apparatus.
FIGURE 2 is a horizontal sectional view of the invention.
FIGURE 3 is a sectional view taken on the line 3—3 of FIGURE 1.

Referring now to the drawings and in particular to FIGURES 1, 2 and 3 thereof, the improved buffing machine, generally designated by the numeral 10, is shown including a base 11, that supports at one end thereof, an upright frame 12, with the upright frame 12 receiving thereon shiftable tire supporting and rotating means 13 that operatively dispose a tire T adjacent a buffer 14 so that the same may have the tread stock removed therefrom upon contact with a buffer 14; the arrangement being such that the buffer 14 is carried by an oscillating frame member 15 so that the depth of penetration during oscillation of the frame member 15 thereof is controlled by cam means 16, that operate to control the spacing between the free ends of the frames 12 and 15, as will presently be described.

In order that the invention might be more readily understood, the above indicated component parts will be separately described, as will the over-all operation of the improved buffing machine 10.

Base 11 and support frame 12

Considering first the structure of the base 11, it will be seen from FIGURE 1 of the drawings that the same comprises a rectangular box-like structure, that houses internally thereof, a mechanism for oscillating a pin member 21 that projects from an appropriate boss member 23 provided on the top surface 22 of base 11, as is clearly indicated in FIGURE 1 of the drawings. In this regard the usual motor and mechanism for oscillating the pin member 21 is not shown for the sake of clarity, it being understood that apparatus of the type set forth and described in detail in co-pending application Serial No. 620,411, filed November 5, 1956, could be utilized in this regard.

As shown in FIGURE 1 of the drawings, the upright frame 12 is disposed adjacent the right-hand end of the base member 11 and projects upwardly therefrom so as to define an upper end 12a that terminates in a horizontal frame member 25 that supports certain mechanism that coacts with the various component parts of the cam mechanism 16 as will presently be described. It is to be understood in this regard that the upright frame 25 may also serve as the support or housing for the necessary switches employed in connection with this invention. However, for the sake of clarity, the location and operation of these switches will not be described, it being understood that switches and electrical connections of the type set forth in the above referred to co-pending application may be employed with satisfactory results. Additionally, in this regard it should be understood that the upper frame 25 may also serve as a point of mounting for certain additional auxiliary side buffing equipment of the type described in co-pending application Serial No. 620,411 and this apparatus is not shown or described herein for the sake of clarity.

For the purpose of variably spacing the oscillating frame member 15, as will presently be described, the free end of the frame member 25 includes an upright frame 26 that supports a threaded shaft 27 that is shown schematically in FIGURE 1 of the drawing. Received on shaft 27 as shown, is a cam plate 28 that is reciprocable axially of the threaded shaft 27 upon operation of a sprocket wheel 29 by a chain or link connected to a motor (not shown) that may be carried by the frame 25. Additionally the free end of the frame 25 also supports a knuckle joint 30 that includes a rotating bushing 31 that connects to the free end of a piston 32. The arrangement being such that the opposed end of the piston 32 is connected, as at 33, to the oscillating frame member 14, so as to permit movement between the full and chain-dotted line positions of FIGURE 1 upon operation of the piston 32.

As indicated in FIGURE 1 of the drawings, the oscillating frame member 15 is shown as having a main vertical portion 40 to which is secured a motor 41 that operates through pulleys 42, bushings 43, 43, and shaft 44 to rotate this brush 14. Additionally, the uppermost end of the vertical section 40 further includes a projecting framework 45, that supports a rotatable roller member 46 that is designed to coact with the cam plate 28 in the manner set forth in co-pending application Serial No. 620,411. It is to be noted in this regard that the higher the vertical position of the cam 28 on threaded shaft 27, the greater the degree of penetration of the revolving brush 14 will be on rotating tire T.

Tire-supporting means 13

Turning next to a detailed consideration of the tire-supporting means 13, it will first be seen that the same includes a trunnion 50 that is secured to the upper face 22 of base 11 and has rotatably received therein an arm member 51, the upper free end of which may be bifurcated as at 52, 52, so as to be journalled about a shaft, 53. Bushing 54 is also shown journalled about the shaft member 53, between members 52, 52. In this manner, a shaft 56 may be rotatable about shaft 53 as a result of connection with bushing 54 with the opposed end of shaft 56, being supported shiftably in bushing 57.

In order that the arm rember 51 may be moved between the full and chain dotted line positions of FIGURE 1, the frame member 12a further includes a flange member 58, which supports a piston 59 that has its projecting end 60 secured to the mid-point of arm 51, as clearly shown in FIGURE 1 of the drawings. In this fashion, upon reciprocation of the piston 59, the arm 51 will be pivoted around the trunnion 50 and during this pivoting the shaft 56 will slide in bushing 57 due to the pivotal mounting of the bushing 54 around shaft 53.

In addition to the aforementioned component parts, the shaft 53 also receives thereon a bushing 61 that has a lug member 62 projecting therefrom for engagement with certain remaining component parts as will be presently described in the ensuing paragraphs.

Referring now to FIGURE 2 of the drawings, it will be seen that one free end of shaft 53 is provided with a sprocket 64, while the other end thereof has a sprocket 64a. A third sprocket 64b, provided on the drive shaft of motor M (see FIGURE 3) thus permits through the usual chain connection, the motor M to drive sprocket 64. A chain connection with split ball halves 65, 65, permits a similar rotation of these components to in turn drive the tire T.

While the above arrangement of component parts indicates that the driving members 65, 65 will be moved between the full and chain-dotted line positions of FIGURE 1 upon actuation of the piston 59, the actual adjustment of the buffing device to accommodate tires of varying bead dimensions is facilitated by the variable mounting of certain roller members designated generally by the numerals 70 and 71, and which engage the tire T as shown in FIGURE 1 of the drawings. These roller members are mounted on a U-shaped bracket 72 with the entire sub-assembly of rollers and brackets being shiftable as a result of the provision of projecting shaft members 76, 76 that are secured to the bracket 72 and project therefrom for reception through appropriate bushings 75, 75. In this manner, the shafts 76, 76 may move relatively of the support bushings 75, 75 which may be secured to the upright frame 12. A piston 78 secured to plate 58 may move these shafts in unison, or if desired, the same may be spring-loaded so as to be normally urged towards the right of FIGURE 1 of the drawings.

The actual roller portion of each of the roller members is shown existing between annular stop members 79, 79, and suitable sleeves 80, 80 of enlarged diameter may surround the individual shafts 82, 82 so as to permit a free rolling contact between the roller members and the tire bead portion as best indicated in FIGURE 3 of the drawings.

For the purpose of complementally engaging the lug member 62, the lower roller member 70 may further include a projecting lug arm 81; the arrangement being such that the lug 62 will be struck by the projection 81 upon movement to the right of shaft 53 to thus cause the entire ball mechanism to rotate clockwise of FIGURE 1 to the chain dotted line position.

Operation of the device

In use or operation of the improved tire buffing machine 10, it will first be assumed that the component parts are positioned as indicated in chain-dotted lines in FIGURE 1 of the drawings, with the split ball members 65, 65 being in a raised or retracted position as a result of the piston 59 having been contracted so as to move the arm 51 to the extreme righthand position of FIGURE 1. Additionally, it will be assumed that the roller members 70 and 71 are in the full line position of retraction.

At this time, it is merely necessary that the tire T be placed over the split balls 65, 65 and the roller members 70 and 71. At this time and upon actuation of the piston 59, the split balls 65, 65 will be moved from the chain dotted line position of FIGURE 1 to the full line driving position thereof as a result of the counterclockwise rotation of the arm 51 about its axis of rotation as the same is defined by the boss member 50, with the weight of the split balls 65, 65 serving to move the same around shaft 53, upon disengagement between lugs 62 and 81. At this time, the piston 78 may be operated to bring the roller units 70 and 71 into firm contact with the tire, whereupon the usual power may be applied by motor M to rotate the split ball members 65, 65, shown in FIGURE 3 for this purpose. At this point and upon rotation of the tire T, the cam 28 may be adjusted so as to control the spacing of the buffer 14, with respect to the axis of rotation in the tire T and as progressive indexing occurs, it is believed apparent that more and more buffing will occur in the manner more fully described in the above referred to co-pending application.

At such time, as the complete vulcanizing operation has been finished, it is merely necessary that the piston 59 be moved toward its contracted position, and as apparent from the drawings, as the shaft member 56 moves to the right, the depending lug 62 will strike the projecting lug 81 with the result that rotation of the ball unit will occur about the shaft 53 with the result that the ball members 65, 65 will be swung upwardly and to the right to the position indicated in chain dotted lines in FIGURE 1, at which time the tire T may be easily removed with respect to the supporting load therefor.

Assuming that a complete buffing operation has been completed on a large tire of the size shown in full dotted lines in FIGURE 1, in the manner just described, it will further be assumed that the next buffing operation is to be done on a tire having a considerably smaller bead diameter in the nature of 15 inches for example. Such a tire is shown clearly in phantom lines in FIGURE 1 of the drawing. In this case the operation will be the same and the tire T will be placed about the roller units 70 and 71 and over the split ball ring 65, 65 and at this time upon operation of the piston 59, the roller members 70 and 71 being in contact with the bead will move to the left toward the phantom line position shown in FIGURE 1, with the positioning of the ball members 65, 65 serving to determine and locate the axial position of the roller members 70 and 71 with respect to their support bushings 75, 75 and with piston 78 serving to firmly retain the just established position. In this instance where a smaller diameter tire is being buffed, a smaller diameter driving wheel 65' is shown for the sake of clarity. It is to be understood, however, that this is optional and that the full line ball 65 could be used instead of the chain dotted one that is illustrated.

In this condition of three point support, rotation will once again be commenced and the buffing operation and cycle will be repeated as previously described.

It will be seen from the foregoing that there has been provided a new and novel type of improved oscillating buffer, that is characterized by the fact that the same is readily adaptable to support a wide range of tires thereon with the tires always being positioned in a uniform condition of proximity with the buffing wheel regardless of the bead diameter of the same.

It has been shown how the operation and construction of the device is such that the same facilitates easy and quick attachment and removal of the tire and particularly the bead portion thereof, regardless of the bead diameter of the tire.

While a preferred embodiment of the invention has been illustrated herein in full detail in accordance with the dictates of the patent statutes, it is to be understood that the invention is not intended to be so limited. Thus, for example, where the roller members 70 and 71 have been illustrated as being positioned by a piston and it is believed to be equally apparent that the same could be spring loaded with substantially equivalent results.

Accordingly, the use of a certain specific terminology herein, is not intended in any way to restrict the scope of the invention, it being the specific intention that the invention should be limited only by the scope of the appended claims.

It accordingly follows that modifications of the invention may be resorted to without departing from the spirit hereof of the scope of the appended claims.

This application is a continuation-in-part of copending applications, Serial No. 593,464 and Serial No. 620,411, filed June 25, 1956, and November 5, 1956, respectively, by Adolf Frohlich and Edward J. Harris.

What is claimed is:

1. Tire supporting means for rotatably supporting a tire, comprising: a frame; an arm hinged to said frame and having a free end; a driving member pivoted to said free end of said arm, and being adapted to engage the internal surface of a pneumatic tire in the crown region thereof; and a pair of idling rolls, carried by said frame in shiftable relationship therewith and being adapted to engage the bead portion of a tire received on said tire supporting means.

2. The device of claim 1 further characterized by presence of means for driving said driving member.

3. The device of claim 1 further characterized by the presence of means for moving said driving member relatively about said free end upon shifting of said idler rolls.

4. The device of claim 1 further characterized by the presence of means for shifting said driving member out of driving contact with the internal crown region of said tire while said idler rolls remain stationary.

5. Tire supporting means for rotatably supporting a tire, comprising: a frame; an arm hinged to said frame and having a free end; a driving member pivoted to said free end of said arm, and being adapted to engage the internal surface of a pneumatic tire in the crown region thereof; a pair of idler rolls, carried by said frame in shiftable relationship therewith and being adapted to engage the bead portion of a tire received on said tire supporting means; and means for pivoting said driving member during movement of said arm around its hinge point.

References Cited in the file of this patent

UNITED STATES PATENTS

| | | |
|---|---|---|
| Re. 20,711 | Connelly | May 3, 1938 |
| 1,668,214 | Liebau | May 1, 1928 |
| 1,848,684 | Woock | Mar. 8, 1932 |
| 1,851,555 | Wheeler | Mar. 29, 1932 |
| 2,085,650 | Godfrey | June 29, 1937 |
| 2,754,905 | Kraft | July 17, 1956 |
| 2,788,851 | Rawls et al. | Apr. 16, 1957 |